United States Patent [19]
Harvey

[11] 4,154,514
[45] May 15, 1979

[54] MOTION PICTURE PROJECTING SYSTEM
[76] Inventor: John S. Harvey, 3193 W. Alexandersville-Bellbrook Rd., West Carrollton, Ohio 45449
[21] Appl. No.: 742,420
[22] Filed: Nov. 17, 1976
[51] Int. Cl.² ............................................. G03B 37/00
[52] U.S. Cl. ...................................... 352/69; 352/86
[58] Field of Search .................... 352/69, 86; 350/191
[56] References Cited
U.S. PATENT DOCUMENTS

| | | | |
|---|---|---|---|
| 3,142,223 | 7/1964 | Vetter | 352/69 |
| 3,475,086 | 10/1969 | Vetter | 352/69 |
| 3,506,344 | 4/1970 | Petit | 352/69 |

Primary Examiner—Monroe H. Hayes
Attorney, Agent, or Firm—Jerome P. Bloom

[57] ABSTRACT

A system for projecting and exhibiting motion pictures creating for the viewer illusory impressions of depth and participation. The system employs a single projector equipped with an anamorphic lens. In preferred embodiment the projector, using a standard 35 mm anamorphic film, projects onto a deeply curved screen. The arrangement is such that the system uniquely functions to produce good image focus over the entire surface of the screen to which the image is applied, lending a viewer a decidedly improved depth of perception.

11 Claims, 4 Drawing Figures

MOTION PICTURE PROJECTING SYSTEM

BACKGROUND OF THE INVENTION

This invention relates to motion picture projecting and exhibiting systems wherein light images, as projected on a screen, are perceived by a viewer as having depth and life-like qualities. Embodiments of the present invention are more economical to fabricate, more efficient and satisfactory in use and enable direct viewing with in depth perception and no strain on the eyes of a viewer.

Prior art systems striving for this end have fallen into obsolesence or greatly reduced use, an important reason therefor being their requirement for special film formats or for multiple projectors, or both. In one well known example, a curved screen is used and three widely spaced projectors operate synchronously, using a special film to project a composite image upon the screen. The use of multiple projectors is required for full screen coverage. Since each projector is responsible for coverage of a separate and individual screen portion, an acceptable overall focus can be obtained. The use of multiple projectors, however, produces visible seams and distortion in the projected image and in other respects can result in substantially less than perfect imagery. There is, of course, a very material disadvantage of cost involved in the need to provide and operate multiple projectors. The requirement for special film in this prior art system is also undesirable, since use of the system is dependent upon decisions of film makers on the practicality of continuing to make available supplies of the special film. In known depth effect systems of the prior art the requirement for a special film format is a common factor which has had a limiting effect on their acceptance and use.

For example, while a conventional 3-D process uses 35 mm film, it is a special film embodying side by side images, which images are projected in superposed relation and require use of special equipment for viewing. It is known that even with the use of special equipment the photographic results have been less than satisfactory. For such reasons the adoption and use of 3-D systems has been extremely limited.

A large number of projection systems, such as Cinemascope and Panavision have used 35 mm anamorphic film but not in such a manner as to contemplate or provide for in depth perception on the part of a viewer.

It is clear from the foregoing that the prior art exhibits a continuing unfulfilled need for an economical system providing in depth perception in comfort for the viewer. This need has been fulfilled by the present invention.

SUMMARY OF THE INVENTION

A motion picture projecting system according to an illustrative embodiment of the invention uses a single projector, a curved screen and anamorphic lens means in a manner enabling what was not heretofore contemplated, a successful use of ordinary standard 35 mm film in a system creating improved depth of perception and a greater sense of participation on the part of a viewer. In a preferred embodiment of the invention 35 mm film is used in the projector with projection being by way of primary and anamorphic lenses. The screen is designed to be deeply curved in an arc occupying a substantial segment of a circle, on the order of 146° and not greater than about 153° or less than about 138°. Horizontal and vertical dimensions are arranged so that the screen will dominate the normal field of vision of the viewer, the horizontal dimension exceeding the vertical dimension according to a preferred ratio. The arrangement preferred is one to cause projected single images totally to cover the screen surface and to do so with a single picture emanating from a single projector in a frontal relation to the screen. As here provided, the curved screen surface operates to intercept the projected image prematurely or before the image reaches an intended focal plane. The arrangement provides that different portions of each element of the image is intercepted in time spaced relation whereby the composite of each element occupies a large number of adjacent parallel planes. The result is an accurate life-like representation of each element which lends the viewer depth of perception without distortion. The use of a continuous lenticular screen assures a clear, unbroken image presentation and prevents cross reflection.

An object of the invention is to provide for improved depth of perception and an illusion of participation on the part of a viewer of a motion picture presentation by means which does not require a use of viewing aids.

Another object of the invention is to achieve a motion picture projection and exhibiting system using an ordinary standard 35 mm film and giving a viewer improved depth of perception.

A further object of the invention is uniquely to combine a deeply curved screen and a single projector in the obtaining of full coverage, well focused image presentation.

Still another object of the invention is to utilize a principle of anamorphosis in conjunction with a single projector and a uniquely configured screen in the achieving of good overall focus and depth effects in a motion picture film presentation.

A still further object of the invention is to provide a screen for use in a motion picture projecting system selectively configured to occupy a predetermined wide arc bearing a predetermined relation to the chord dimension between side extremities insuring full coverage by images projected from an anamorphic film through an anamorphic lens and providing a viewer with improved depth of perception and an illusion of participation on the part of a viewer.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention, FIG. 1 is a diagrammatic plan view of a motion picture projecting system according to an illustrative embodiment of the invention;

Like parts are indicated by similar characters of reference throughout the several views.

Figure 1:
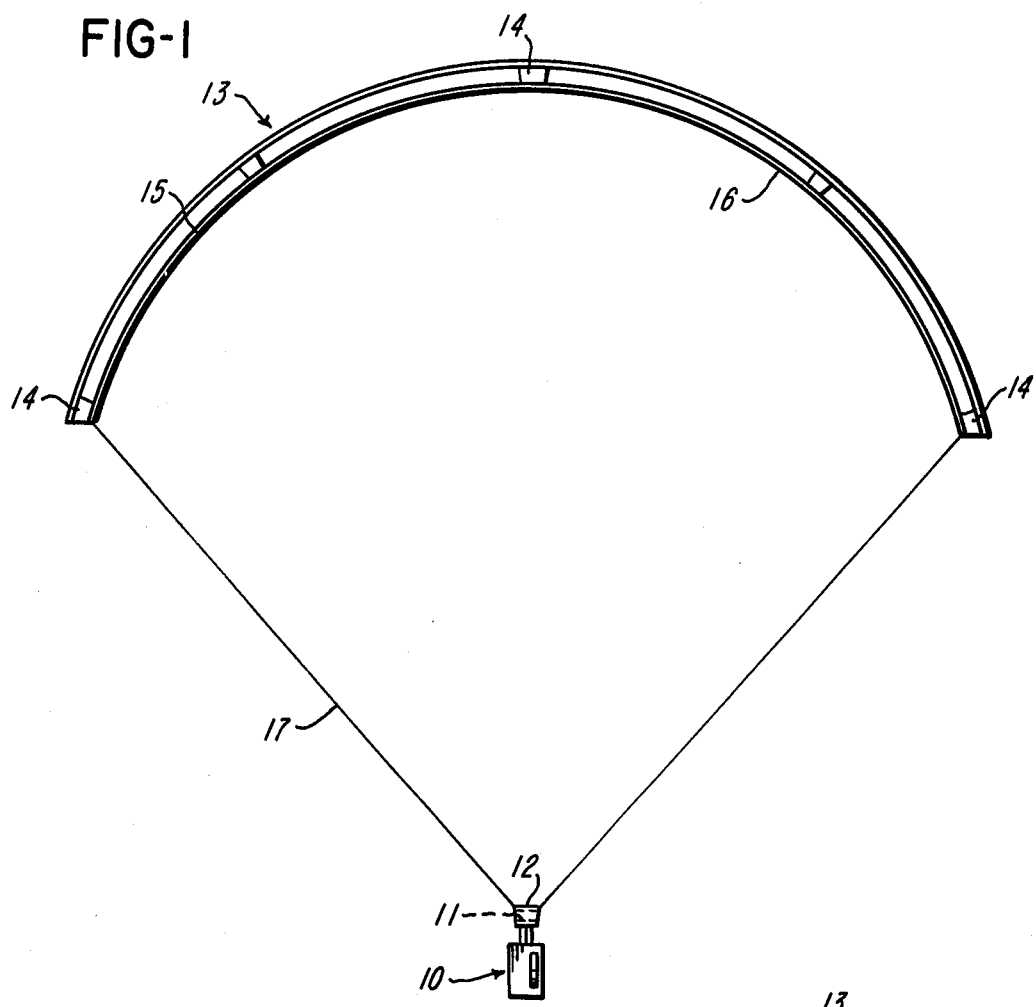

The drawings show a projector 10 of a kind adapted to the showing or exhibition of an ordinary 35 mm motion picture film. The illustration of the projector is exemplary only and in diagrammatic form since the invention contemplates a use of any one of the well known standard 35 mm motion picture film projectors. As is usual, the projector will include an appropriate primary lens 11 selected to fit the intended application. In accordance with the present invention, the projector is further equipped with an anamorphic projection attachment including an anamorphic lens 12 positioned adjacent to and beyond lens 11 in the sense of travel of the projected light images. The showing of the attachment including the lens 12 is not detailed since the nature of such a unit is well known in the art.

As shown, an installation per present invention features a particularly configured deeply curved screen unit 13 the viewing surface of which provides a focal target in a confronting predetermined spaced relation to the projector 10. The physical composition of the screen 13 may assume various forms including that illustrated in which a rigid upright framework 14 is in a backing relation to a screen portion 15.

In preferred embodiment, the screen portion 15 has a sheet-like form and presents a continuous, unbroken surface 16 to light images emanating from the confronting projector 10. It is made in such case, of a flexible fabric material preferably one selected from known screen materials providing a lenticular surface.

Figure 2:
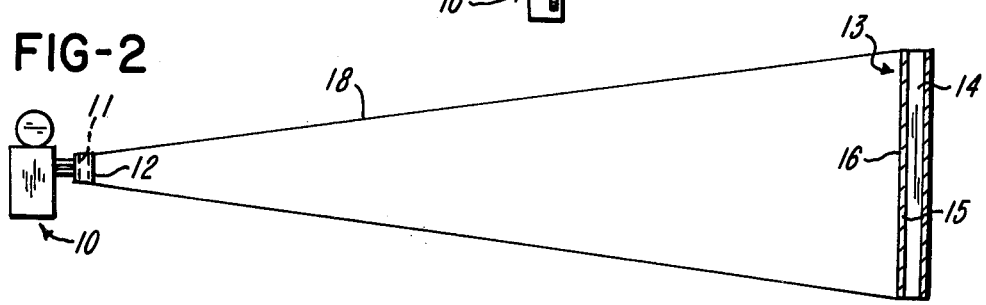
FIG. 2 is a side elevation view of the systems of FIG. 1, the screen being shown in cross section.

The concave side of the curved screen 13 has a relatively deep curvature and provides its image receiving surface 16. In its optimal configuration the surface 16 occupies an arc corresponding to about 146° of a circle. It is substantially wider than it is high, its horizontal and vertical dimensions approximating an average field of vision, estimated at approximately 160° in a horizontal sense and 60° in a vertical sense. In the case of a screen having a lateral arcuate extent of 146°, as above mentined, the ratio of screen width in proportion to screen height is preferably and optimally on the order of 2.25 to 1. The screen accordingly is sized and configured to dominate the sight lines and normal field of view of the great majority of screen viewers, having in mind particular seating and other physical characteristics of an auditorium or other screen location. In this same connection, in a preferred embodiment, the screen, the projector and related equipment will be so adapted and located that the projected image will be totally intercepted by and precisely fill the image receiving surface 16 of the screen. In such case, as indicated in FIGS. 1 and 2, a horizontally expanding light image directed from the projector impacts on the screen at a point in time when its lateral extremities 17 are essentially in line with the lateral extremities of the screen. Similarly, at a same point in time, the vertical extremities 18 of the image are essentially in line with vertical extremities of the screen.

In 35 mm projection systems of the prior art using a single projector it has been regarded as necessary to use a screen with little or no curvature in order to insure good overall picture focus. Thus, a projected image has usually been aimed at a focal plane where it achieves a best focus. Experimental efforts to interrupt a projected light image in advance of that focal plane, using a curved screen in accordance with prior practice, resulted in a reduction of the sharpness of the applied image and provided distortion, particularly in the areas adjacent the side extremities of the screen utilized.

In accordance with the instant invention, however, it has been discovered that when a single projector is used to project images from anamorphic film through an anamorphic lens and in combination with a deeply curved screen having a particular configuration and size, a viewer is presented with a clear life-like image giving the viewer a distinct impression of depth as well as good overall picture focus.

In actual embodiment of the invention a single 35 mm projector, equipped with an anamorphic lens and using anamorphic film, has projected light images on a screen the viewing surface of which occupies an arc of 146° of a circle with sharp picture focus not only in a central screen portion but also in right and left hand screen areas all the way out to their lateral extremities. It has been found, moreover, that when light images impact, the elements thereof so dispose as to be life-like in character and to lend an impression of life-like depth.

It is not understood to be necessary that this phenomenon be totally commmprehended or even that theories which can be advanced in explanation thereof be precisely correct. It is believed, however, that the invention system works as described because the arrangement of its parts enables that focal point areas be artifically created in the curved screen in advance of what would normally be a main focal plane in accordance with prior art practice. In the case illustrated, such plane would be a vertical plane which is tangent to the deepest part of the convex rear surface of the screen 13. It is particularly significant in use of the invention system that each element of an image being projected has different portions thereof impacting on the deeply curved screen surface 16 in different focal planes. This lends unique depth perception to a viewer. Moreover, impact of the various portions of each dominant element of the image causes, in effect, a lateral expansion of the image element giving it an essentially true to life configuration, in spite of the fact the image has been intercepted prior to reaching what heretofore has been contemplated as its normal focal plane.

Figure 4:
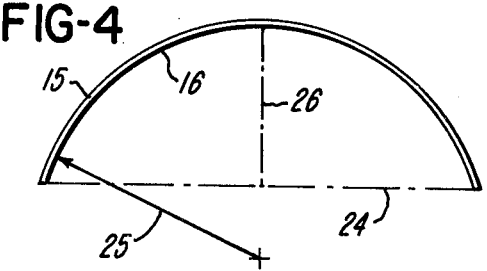
FIG. 4 is a schematic view indicating critical parameters of the included screen.

The screen 13 illustrated has been determined to give best results if its arcuate lateral extent corresponds to 146° of a circle. Within certain prescribed limits, however, the arcuate lateral extent of the screen viewing surface can be varied and still give excellent results. Experimentation has indicated that a screen viewing arc of not less than 138° and not more than 153° will provide highly satisfactory picture quality. It should be understood in this connection that in the interest of maintaining a deeply curved screen as here required a change in the arcuate lateral extent of the viewing surface of the screen from 146° will involve a change in the radius of the formed arc. A formula has been evolved in this regard for determining the proper radius by referencing it to the dimension of the chord defined between the lateral extremities of the viewing surface 16. In FIG. 4 this chord is shown by the dotted line 24. Per the invention, the radius of the horizontally extending arc of the viewing surface 16 has been determined for optimal results to equal approximately 52.63% of the chord dimension 24. Accordingly, in design of a screen 13 for the invention system, the desired chord dimension 24 is first established whereupon this chord dimension is multiplied by 0.5263 to achieve a proper radius by means of which the horizontal extent of the screen viewing surface should be defined. A radius resulting is indicated in FIG. 4, by the line 25. A line 26 designates the distance between the chord center and the center of the arc defining the lateral extent of the screen viewing surface. The depth of the screen arc as represented by line 26 is equal to the chord dimension multiplied by 0.3684, for a screen arc of 146°.

Figure 3:
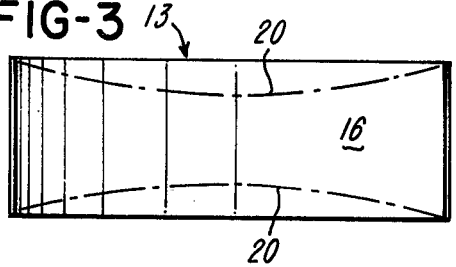
FIG. 3 is a front view of the screen comprised in the projecting system.

On employing the apparatus of the invention and a screen with the limitation described there is created an optical illusion lending itself to creating an in depth perception on the part of a viewer. This is illustrated in FIG. 3 of the drawings. As there shown, to a viewer it will appear that the vertical height of the screen will gradually diminish in a relatively uniform fashion from its lateral extremities towards a vertical line through its center. This occurs in spite of the fact that in a frontal view the boundaries of the viewing surface 16 of the screen do in fact define a rectangle.

It has been heretofore mentioned that in utilizing a screen the arcuate lateral extent of which is 146° of a circle, its width in proportion to its height should preferably be on the order of 2.25 to 1. This ratio may be varied somewhat. However, the ratio should not be less than 2.22 to 1 to insure against a cutting off of pictorial information that would otherwise apply to the lateral extremities of the viewing surface. Moreover, this ratio should not be more than 2.32 to 1 since it has been found as a result of extensive study that this would undesirably affect the optimal in depth perception lent a viewer in accordance with a proper practice of the present invention.

In installations of the screen surface 16 it is desirable that they be essentially flat from bottom to top except that there may be a slight bowing in a mid portion of the vertical extent, which is inherently a consequence of securing the screen fabric 15 to its supporting frame.

Particular attention is directed to the fact that the use of the invention does not demand an availability and application of special film. A big advantage thereof is that the invention objectives and improvements may be achieved utilizing ordinary standard 35 mm film made anamorphic by having images recorded thereon through an anamorphic lens and then projected, for viewing, through an anamorphic lens. The fact that only a single projector is needed to achieve the in depth perception effect is again of major importance to the motion picture industry. The discovery of the advantages of the special configuration of a screen within the limits described lends another feature affording advancement in the art of motion picture projection.

Thus, the invention eliminates the need for special film and/or multiple projectors and obviates the need for visual aids as are required in accordance with prior art proposals to achieve in depth perception of a motion picture and a feeling of participation in the picture on the part of a viewer.

While the invention has been described with reference to using ordinary standard 35 mm film, it will of course be obvious that it may be equally adapted to enable the application of any other ordinary standard film available to those involved in the making of motion pictures and the projection thereof for viewing. It is also noted that while the perferred embodiment of the invention specifies the use of a lenticular screen surface, the concepts of the invention can be satisfactorily employed using other types of screen surfaces.

In conclusion, the foregoing indicates that the present invention provides a superior motion picture projecting and exhibiting system and improved components thereof featuring a deeply curved screen presenting an optimally configured and sized viewing surface. Novelty is also inherent in the arrangement using anamorphic film and an anamorphic projection lens with the screen, the latter of which provides for interception of an expanding image in advance of its normally anticipated focal plane and in a manner to produce time spaced impact on the screen of portions of the same elements of the image whereby to cause the elements to dispose on the screen in a clear unmistakeable life-like fashion and in a manner to lend in depth perception to the viewer. The screen design is calculated to dominate and encompass the normal field of vision of an average viewer and in preferred embodiment its viewing surface is fully occupied by the projected image which lies within the boundaries thereof and in a uniformly well focused condition. By controlling the curvature of the screen, one does, moreover, achieve a fidelity of representation which has not heretofore been anticipated in the use of curved screens receiving a single image.

From the above description it will be apparent that there is thus provided a device of the character described possessing the particular features of advantage before enumerated as desirable, but which is obviously susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A motion picture projecting system comprising a single projector including means for projecting images conventionally from anamorphic film through an anamorphic lens and a screen positioned to have images so projected cast thereon, said screen having a viewing surface which is deeply curved, the lateral extent of the curve of said screen being limited to a range of 138° to 150° and its viewing surface being positioned and configured to intercept the total of each image in advance of what would be considered its normal focal plane and to have the image essentially fill its viewing surface whereby to have the elements of said image disposed thereon in a manner to lend a depth of perception and a sense of participation on the part of a viewer.

2. A motion picture projecting system as in claim 1 wherein said projector is a standard 35 millimeter projector utilizing anamorphic film each frame of which embodies a single image and there is a single anamorphic lens providing that there is a single image projected in respect to each representation on said film.

3. A motion picture projecting system as in claim 1 characterized in that said projector includes primary lens means and a single anamorphic lens means in series relation providing that the projector utilizes standard anamorphic film wherein the image representations are provided in successive following relation, providing thereby that projection produces a succession of single images each one of which is impacted on said screen viewing surface in advance of what would normally be considered its normal focal plane and the curve of said viewing surface presented to and receiving said image being deeply concave and formed on a radius to provide that the elements of each image which impact thereon include portions lying in adjacent and separate planes, creating thereby, an impression of depth to the various elements of the image.

4. A motion picture projecting system as in claim 3 wherein the relative positions of said single projector and said viewing surface are established to give the viewer an impression that the vertical extent of the screen at its center is less than that at its lateral extremities.

5. A motion picture projecting system as in claim 1 wherein the arcuate lateral extent of said screen viewing surface is approximately 146° of a circle.

6. A motion picture projecting system as in claim 1 wherein the arcuate lateral extent of said screen defines a chord between its lateral extremities and the curve of said viewing surface is formed on a radius the dimension of which is slightly greater than one-half that of said chord.

7. A motion picture projecting system as in claim 1 wherein said screen is provided with a lenticular type viewing surface.

8. A motion picture projecting system as in claim 1 wherein said screen viewing surface has a width to height ratio not less than 2.22 to 1 and not more than 2.32 to 1.

9. A motion picture projecting system as in claim 8 wherein said ratio is 2.25 to 1.

10. A motion picture projecting system as in claim 8 wherein said viewing surface has an arcuate lateral extent corresponding to 146° of a circle and the radius on which it is formed has a dimension approximately one-half that of its chord.

11. A motion picture projecting system as in claim 1 wherein said viewing surface is concave, continuous in nature and lenticular in character.

* * * * *

UNITED STATES PATENT AND TRADEMARK OFFICE
CERTIFICATE OF CORRECTION

PATENT NO. : 4,154,514
DATED : May 15, 1979
INVENTOR(S) : John S. Harvey

It is certified that error appears in the above–identified patent and that said Letters Patent are hereby corrected as shown below:

Col. 2, line 59, "systems" is corrected to read -- system --.

Col. 4, line 18, "commprehended" is corrected to read -- comprehended --.

Signed and Sealed this

Eighteenth Day of September 1979

[SEAL]

Attest:

LUTRELLE F. PARKER

Attesting Officer    Acting Commissioner of Patents and Trademarks